(12) United States Patent
Blume

(10) Patent No.: US 12,176,848 B2
(45) Date of Patent: Dec. 24, 2024

(54) ADAPTIVE PHOTOVOLTAIC SYSTEM

(71) Applicant: Inergy Holdings, LLC, Chubbuck, ID (US)

(72) Inventor: Zachary Dennis Blume, Orem, UT (US)

(73) Assignee: INERGY HOLDINGS, LLC, Chubbuck, ID (US)

( * ) Notice: Subject to any disclaimer, the term of this patent is extended or adjusted under 35 U.S.C. 154(b) by 0 days.

(21) Appl. No.: 17/984,915

(22) Filed: Nov. 10, 2022

(65) Prior Publication Data
US 2024/0162856 A1   May 16, 2024

(51) Int. Cl.
*H02S 40/36* (2014.01)
*G05F 1/67* (2006.01)
*H02J 3/38* (2006.01)

(52) U.S. Cl.
CPC ............. *H02S 40/36* (2014.12); *G05F 1/67* (2013.01); *H02J 3/381* (2013.01); *H02J 2300/26* (2020.01)

(58) Field of Classification Search
CPC ............. H02S 40/36; G05F 1/67; H02J 3/381
See application file for complete search history.

(56) References Cited

U.S. PATENT DOCUMENTS

| | | | |
|---|---|---|---|
| 10,038,317 B1* | 7/2018 | McCracken | H02S 50/00 |
| 2013/0056614 A1* | 3/2013 | Balachandreswaran | G01J 1/0242 250/203.4 |
| 2020/0279963 A1* | 9/2020 | Yoscovich | H01L 31/022433 |
| 2022/0147091 A1* | 5/2022 | Liu | H02J 7/35 |

OTHER PUBLICATIONS

Nguimfack-Ndongmo et al., "Nonlinear neuro-adaptive MPPT controller and voltage stabilization of PV Systems under real environmental conditions", Energy Reports 8 (2022) 1037-1052. (Year: 2022).*

* cited by examiner

*Primary Examiner* — Tae-Sik Kang
(74) *Attorney, Agent, or Firm* — Kunzler Bean & Adamson

(57) ABSTRACT

Apparatuses, systems, methods, and computer program products are disclosed for an adaptive photovoltaic system. Solar panel strings comprise solar panels. An adaptive maximum power point tracking ("MPPT") translator module is in electrical communication with the solar panels of the solar panel strings. An adaptive MPPT translator module comprises a voltage converting unit. An adaptive MPPT translator module is configured to control the solar panels of the solar panel strings according to a MPPT translator algorithm so that each of the solar panel strings vary in number of the solar panels and in power output capacity of the solar panels and physical configurations of the solar panel strings are adaptive to power needs, physical surfaces, and environmental geometric space constraints. A power bus provides electrical communication between the adaptive MPPT translator module and a power hub in electrical communication with a power demand.

17 Claims, 4 Drawing Sheets

ADAPTIVE PHOTOVOLTAIC SYSTEM

FIELD

The present disclosure generally relates to photovoltaic power generation systems and more particularly relates to power generation systems that can be scaled to match demand.

BACKGROUND

People may install solar panels or other power sources that use renewable energy for a variety of reasons. For example, power from renewable energy sources may reduce dependence on non-renewable energy from fossil fuels, reduce carbon emissions, reduce power bills, provide backup power for use in a power outage, provide off-grid power for mobile or remote locations, or the like. Solar panels or other renewable energy sources may be installed in residences, commercial spaces, and other locations. Photovoltaic cells grouped into solar panels can be highly dependent on environmental conditions such as sunlight conditions and the characteristics of the electrical loads placed on the system. For example, a power drop in one or more panel (such as shading or malfunction) may cause a matching power drop in the entire panel array. When designing a solar power system, wires may be manually selected and sized to match power generation levels and predefined voltages, and maximum panel, string and array sizes may be calculated. Creating arrays that meet environmental geometric space constraints may further complicate the design as variations in panel size and string length may be accounted for. Installing a system with sufficient power generation and energy storage capacity to fully meet energy needs, provide room to grow, or provide power outside the system may be cost-prohibitive. Conversely, installing a small system may reduce initial costs but "lock" the users into a system that does not fully meet their needs and that is impractical to expand.

SUMMARY

The following summary of the invention provides a basic understanding of some aspects and features of the invention. This summary is not extensive, and as such is not intended to particularly identify all key and critical elements of the invention, or to delineate the scope of the invention. Its sole purpose is to present some concepts of the invention in simplified form as a prelude to the more detailed description presented below.

Adaptive photovoltaic systems are presented. In one embodiment, a system includes a power hub. One of more solar panel strings, in certain embodiments, include one or more solar panels. An adaptive maximum power point tracking ("MPPT") translator module, in some embodiments, is in electrical communication with the solar panels of the solar panel strings. An adaptive MPPT translator module, in one embodiment, comprises a voltage converting unit. In a further embodiment, an adaptive MPPT translator module is configured to control the solar panels of the one or more solar panel strings according to a MPPT translator algorithm so that each of the one or more solar panel strings vary in number of the solar panels and in power output capacity of the solar panels. Physical configurations of the one or more solar panel strings, in one embodiment, are adaptive to power needs, physical surfaces, and/or environmental geometric space constraints. A system, in some embodiments, includes a power bus configured to provide electrical communication between the adaptive MPPT translator module and the power hub in electrical communication with a power demand.

Apparatuses are presented for adaptive photovoltaic systems. In one embodiment, a voltage converting unit comprises an electrical input and an electrical output. An adaptive MPPT translator module, in certain embodiments, is configured to control solar panels of one or more solar panel strings according to a MPPT translator algorithm, so that each of the one or more solar panel strings vary in number of the solar panels and in power output capacity of the solar panels and physical configurations of the one or more solar panel strings are adaptive to power needs, physical surfaces, and/or environmental geometric space constraints. In some embodiments, an adaptive MPPT translator module provides electrical power from the electrical input of the voltage converting unit to the electrical output so that the electrical power is usable by a downstream power demand.

Methods are presented for adaptive photovoltaic systems. A method, in one embodiment, includes providing a plurality of solar panels arranged in one or more solar panel strings configured to provide input power. A method, in a further embodiment, includes using one or more voltage converting units at ends of each of the one or more solar panel strings to perform a MPPT translator algorithm. In certain embodiments, a method includes receiving output from each of the voltage converting unit onto a bus, the bus configured to supply the output to a power demand.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
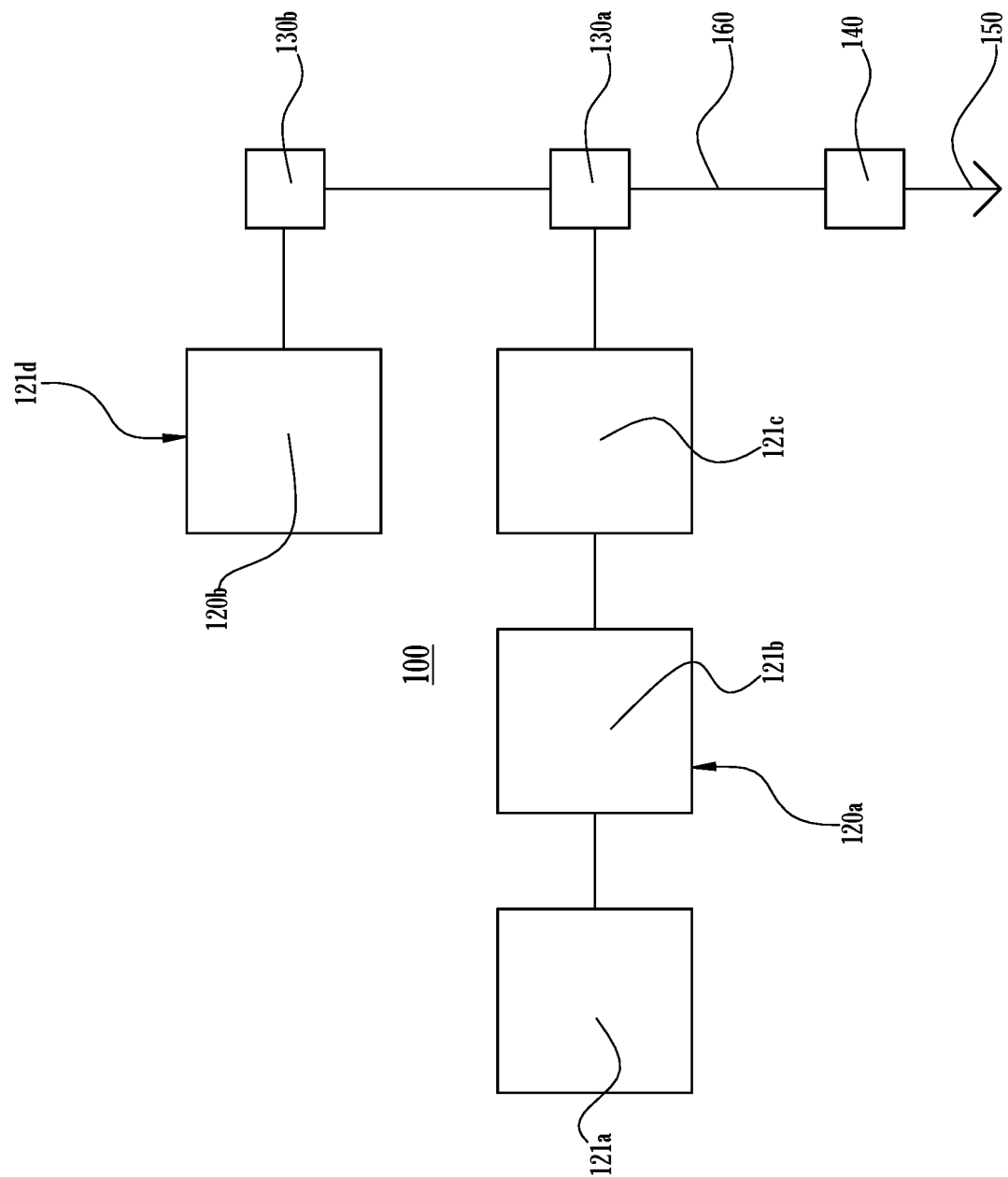
FIG. 1 is a schematic block diagram illustrating one embodiment of an adaptive maximum power point tracking ("MPPT") translator photovoltaic system.

Reference throughout this specification to "one embodiment", "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of controllers. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a controller to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Reference will be made throughout this specification to various terms related to the field of photovoltaics. Terms such a "solar cell", "photovoltaic ("PV") cell", and the like, are well understood and defined in the art. It will be understood that "solar panels", "PV panels", "PV modules", and the like may refer to a collection of any number of solar cells. Further "solar panel string", "panel string", "PV string" and the like may refer to any number of solar panels arranged in series electrical connection. Yet further, "solar panel array", "panel array", "PV array" and the like may refer to any number of solar panels strings arranged in parallel electrical connection to create a solar panel array.

Further reference will be made throughout the specification to "electrical connectors", "releasable connectors", "electrical connection", components that are "coupled", "data connection", "data connector" and the like; it will be understood that a variety of AC and DC connectors and connection means or a combination of such may be substituted for the connector or connection means suggested in this specification. For example, electrical connections may be a trace connection on a printed circuit board ("PCB"), a solder connection, crimp connection, and the like. Further, AC electrical connectors may include: power outlets conforming to the standards of the U.S. National Electrical Manufacturers Association (NEMA) or outlets more commonly used outside North America, such as British, Australian, European, or Japanese sockets, or an "international" socket shaped to accept multiple types of plugs. Further DC electrical connectors may include: 12V cigarette light sockets, universal serial bus ("USB"), MC4, EC8, barrel connectors, screw terminals and the like. When a non-releasable connection (for example a solder connection) is suggested in a particular embodiment a releasable connection mechanism (such as a USB connector) may be used in an alternate embodiment. Likewise, a non-releasable connection mechanism may be used in place of the releasable connection mechanisms suggested in a given embodiment. Additionally, AC type connectors, DC type connectors and data type connectors may all be substituted one to another. Further male connectors may be exchanged for female connectors or a hermaphroditic connector in any given embodiment unless otherwise stated.

FIG. 1 is a diagram of an adaptive maximum power point tracking ("MPPT") translator photovoltaic system 100. The system 100, in the depicted embodiment, comprises a plurality of solar panels 121*a-d*. Solar panels 121*a-c* are arranged in a solar panel string 120*a* and solar panel 121*d* is arranged as solar panel string 120*b*. In practice, solar panel string 120 may comprise a quantity of solar panels 121 from one to any number of panels 121 that satisfies current and/or voltage limitations, if any. Solar panels 121 within a string 120 may be wired in series, parallel or mixed configurations. Additionally, there may exist a number of solar panel strings 120 from one to any number of panel strings 120 that satisfies current and/or voltage limitations, if any.

A string 120*a*, in the depicted embodiment, is terminated with an adaptive MPPT translator module 130*a* and another string 120*b* is terminated with an adaptive MPPT translator module 120*b*. In the depicted embodiment, modules 130*a-b* are wired in parallel (in this preferred embodiment, but in other embodiments may be wired in series) to an electrical power bus 160. An electrical bus 160, in the depicted embodiment, is electrically connected to a photovoltaic system power hub 140. The power hub 140, in certain embodiments, may be a solar MPPT, another type of MPPT, PWM or other electrical or solar system hub designed to control power systems. A power hub 140, in some embodiments, is configured to optimize power generation in a photovoltaic power system. A power hub 140, in the depicted embodiment, is connected to a load 150, which represents any downstream system or load selected by a user.

Solar panel power generation may be highly dependent on environmental conditions such as sunlight conditions and the characteristics of the electrical loads placed on the system. One or more MPPT translator modules 130*a-b*, in certain embodiments, may use MPPT methods to provide consistent evaluation of conditions and optimization of power generation in solar panels 121. One or more MPPT translator modules 130*a-b* may also use MPPT to compensate for power load requirements.

In one embodiment, by using multiple MPPT translator modules 130*a-b*, a power drop in one solar panel 121*a-c* (e.g., due to shading and/or a panel malfunction) will not cause a matching power drop in the entire array. If a power optimizer, such as a DC optimizer, micro-inverter, or the like were used to provide MPPT at a panel or string instead of a MPPT translator module 130*a-b*, it may communicate with and/or be controlled by a central MPPT controller or other hub, limiting an ability to interconnect a generic MPPT hub from an alternate manufacturer but instead requiring a proprietary MPPT hub, or the like.

A plurality of adaptive MPPT translator modules 130*a-b*, in some embodiments, terminate solar panel strings 120*a-b*. One or more MPPT translator modules 130*a-b* may optimize DC power produced by one or more solar panels 121*a-c* using a MPPT algorithm. A MPPT translator module 130*a-b* may individualize optimization for each string 120*a-b*, so that if one string 120*a-b* is under shade (or otherwise power limited) that string 120*a-b* does not affect the whole array. An MPPT translator module 130*a-b* may permit solar panel strings 120*a-b* to vary in current output, hence strings 120*a-b* may vary in size of panels, number of panels, or the like. This may facilitate scalability and/or modularity of the photovoltaic system 100 while allowing adaptability to environmental geometric space constraints. In certain embodiments, one or more adaptive MPPT translator modules 130*a-b* may have wireless modules and/or power line communication ("PLC") modules in order to perform a rapid shutdown operation (e.g., per industry standards such as National Electric Code ("NEC") 690.12, or the like).

Multiple adaptive MPPT translator modules 130a-b may be connected along an output bus 160 or the like to a generic (e.g., from a third-party manufacturer or the like) MPPT hub 140 or other solar system hub 140 (which may include a pulse-width modulation ("PWM") hubs or others). One or more adaptive MPPT translator modules 130a-b may simulate the behavior of a typical solar panel 121a-c, so that a generic MPPT or hub 140 may be used rather than a product that needs to communicate with the adaptive MPPT translator modules 130a-b (e.g., such as may be used by a DC optimizer, or the like).

Figure 2:
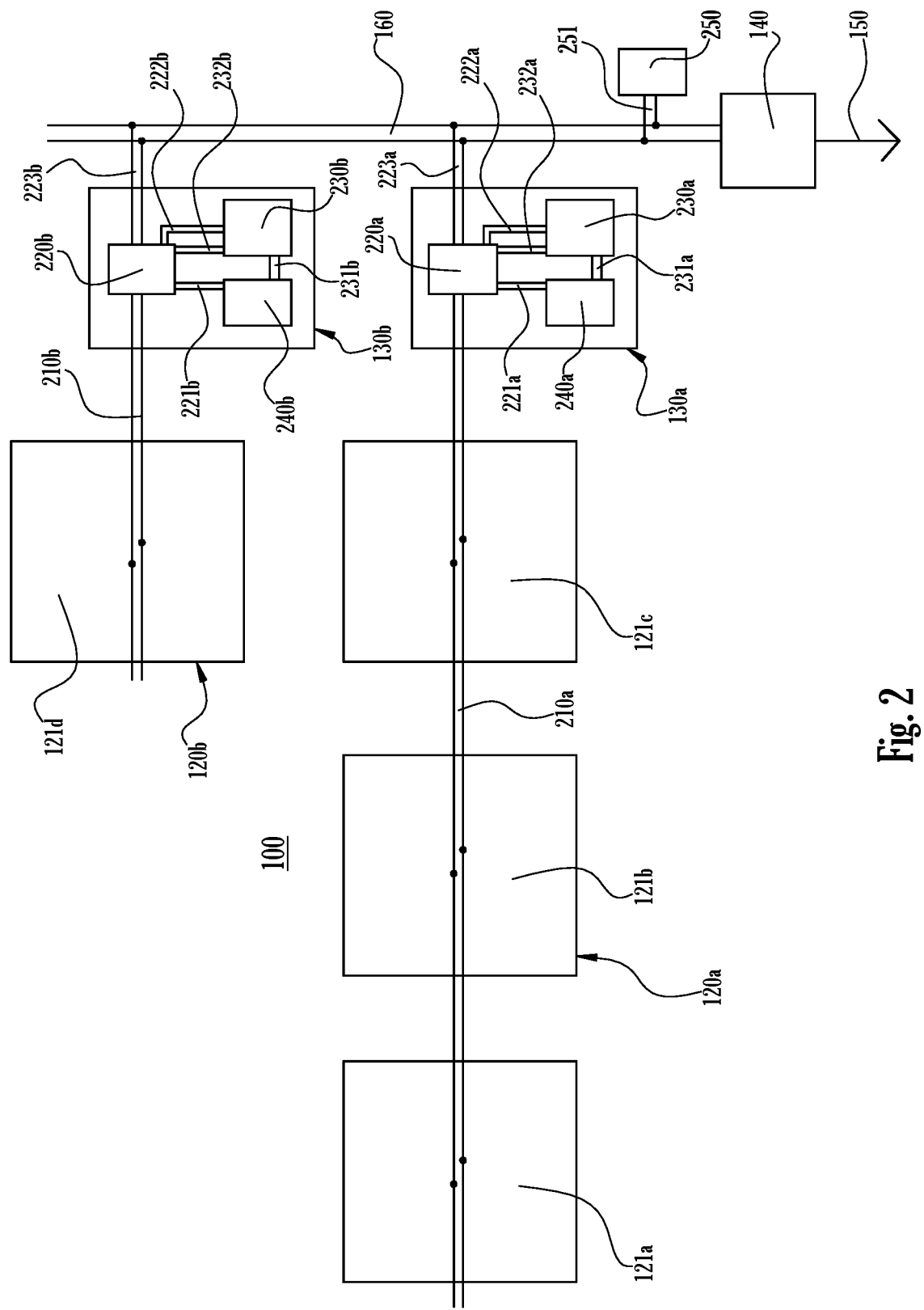
FIG. 2 is a schematic block diagram illustrating one embodiment of an adaptive MPPT translator photovoltaic system using wireless modules.

FIG. 2 is a diagram of an adaptive MPPT translator photovoltaic system 100. The system 100 of FIG. 2, in certain embodiments, may be substantially similar to the system 100 described above with regard to FIG. 1. The system 100 depicted in FIG. 2 illustrates that, in one embodiment, each solar panel 121a-d may be electrically connected to either string bus 210a or 210b. The adaptive MPPT translator modules 130a-b may comprise a voltage converting unit 220a-b in electrical connection with respective string buses 210a-b. A voltage converting unit 220a-b may be any variable output voltage regulator or variable output regulator, and in some embodiments may be combined with an inverter, such as a linear voltage regulator, switching voltage regulator, inverter, transformer, microinverter, and/or any combination of these. In one embodiment, a voltage converting unit 220a-b may comprise a variable output DC-DC switching voltage regulator circuit that may modulate output based on received communication signals.

Adaptive MPPT translator modules 130a-b, in the depicted embodiment, further comprise processors 230a-b. A processor 230a-b, in various embodiments, may comprise one or more processors, microprocessors, microcontrollers, field programmable gate arrays ("FPGAs") or other programmable logic, application-specific integrated circuits ("ASICs"), or other processing technology. In the depicted embodiment, the processors 230a-b are in electrical communication with a voltage converting unit 220a-b via a communication bus 222a-b, such that a processor 230a-b may modulate the variable voltage output of voltage converting unit 220a-b. Further, a processor 230a-b may receive communication from a variable voltage converting unit 220a-b such as real-time voltage and current readings. The processors 230a-b may be powered via processor power buses 232a-b in electrical connection with voltage a converting unit 220a-b, or the like.

Adaptive MPPT translator modules 130a-b may further comprise wireless modules 240a-b. A wireless communication module 240a-b, in various embodiments, may comprise a Wi-Fi module and/or Bluetooth module and/or another wireless communication module. One or more wireless modules 240a-b may be powered via wireless power buses 221a-b which may be in electrical connection with voltage converting units 130a-b. Further, one or more wireless communication modules 240a-b may be in electrical communication with one or more processors 230a-b via a wireless communication bus 231a-b. One or more wireless communication modules 240a-b, in certain embodiments, may be used to communicate with a user and/or to log data to outside devices, such as a smartphone or mobile computer. A wireless rapid shutdown transceiver 250, in the depicted embodiment, is in electrical communication with an electrical power bus 160 via a transceiver bus 251. A wireless rapid shutdown transceiver 250 may be in wireless communication with one or more wireless communications modules 240a-b enabling a 'rapid shutdown' to be performed at the voltage regulator 220a-b level, such as a rapid shutdown defined in NEC 690.12, or the like.

One or more voltage converting units 220a-b may be in electrical communication with an electrical power bus 160 via one or more translator output buses 223a-b, or the like. One or more voltage converting units 220a-b may operate in conjunction with one or more processors 230a-b using a MPPT algorithm. A MPPT algorithm may be directed by one or more processors 230a-b and enacted by one or more voltage converting units 220a-b. A MPPT algorithm may operate according to one or more rules and/or priorities. For example, in one embodiment, with one being a highest priority and four being a lowest priority, a MPPT algorithm may operate in a manner to defer to higher priority items, with priority one being that voltage converting units' 220 output amperage be maintained under a set level (e.g., 10 amps, or the like based on a conductor size of a bus 160); priority two being that the voltage converting units' 220 output voltage stay within a range that is useable by downstream systems such as the power hub 140 (e.g., between about 12-500 VDC, between a user adjustable range, or the like), priority three being that a measure of MPPT is performed, specifically that: 1) as voltage converting units' 220 input power rise begins decelerating, output voltage droops, 2) that output voltage droop increases if input power decreases, and 3) conversely output voltage raises as input power begins to increase, so that a 'measure of MPPT' may be performed while maintaining usability of voltage converting units' 220 output by common central MPPT's or other power hubs 140 from various manufacturers; priority four being, assuming input power is unchanging, a higher output voltage is favored due to higher efficiency in transmission through bus 160; and/or other priorities and orders of priorities.

Figure 3:
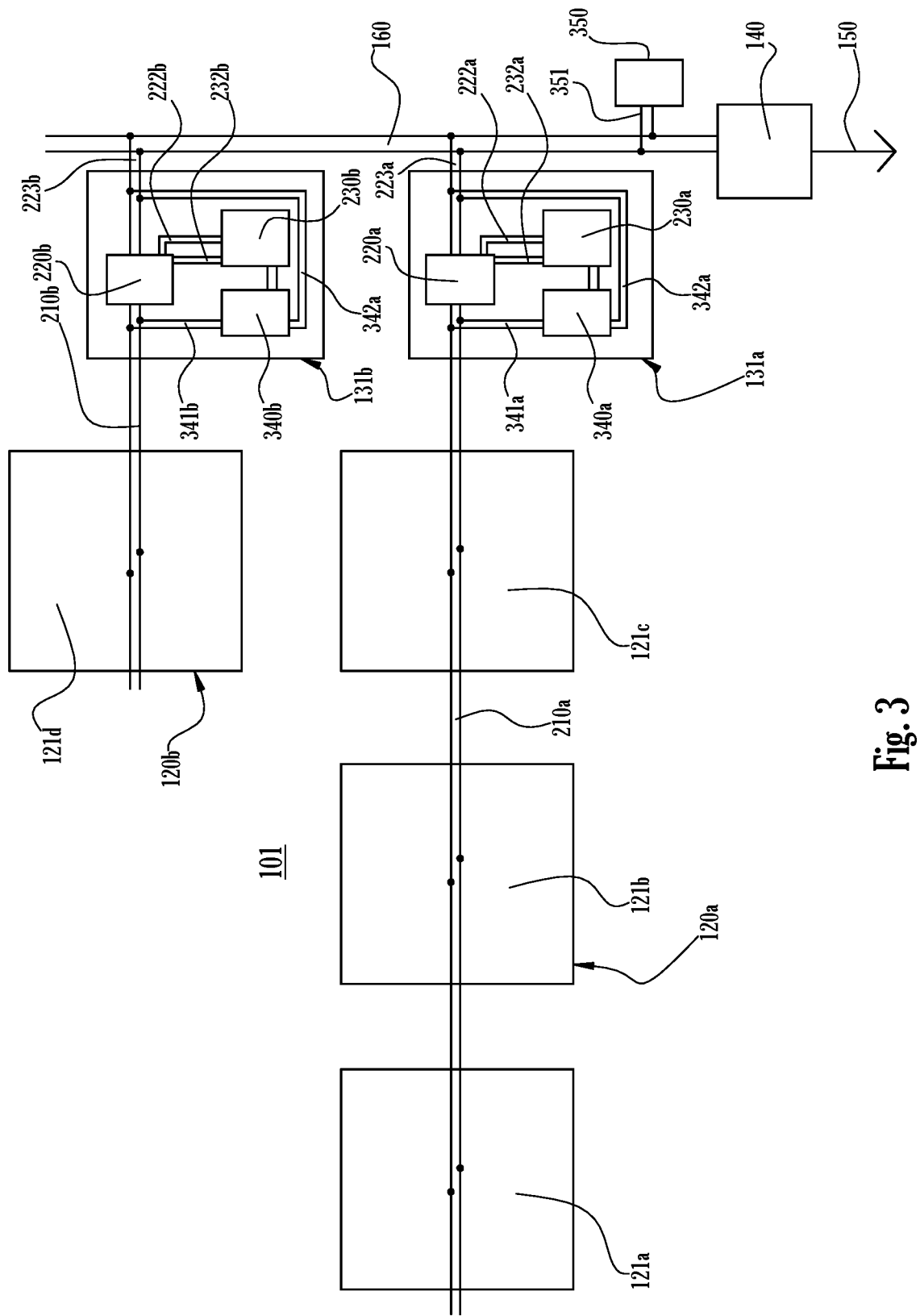
FIG. 3 is a schematic block diagram of one embodiment of an adaptive MPPT translator photovoltaic system using power line communication.

FIG. 3 is a diagram of an alternate embodiment of adaptive MPPT translator photovoltaic system 101 and may be similar in configuration to the system 100 described above with regard to FIG. 1 and/or FIG. 2, with one deviation being that it demonstrates usage of power line communication rather than wireless communication to perform rapid shutdown. The system 101, in the depicted embodiment, comprises alternate adaptive MPPT translator modules 131a-b. MPPT translator modules 131a-b, in certain embodiments, may comprise power line communication ("PLC") modules 340a-b in electrical connection with respective buses 210a-b via 341a-b and 223a-b via 342a-b. MPPT translator modules 340a-b may further be in electrical communication with respective processors 230a-b. Further PLC MPPT translator modules 340a-b may be in electrical communication with a PLC rapid shutdown transceiver 350 via buses 340a-b, 223a-b, 160 and 351. PLC MPPT translator modules 340 may communicate with PLC transceiver 350 using power line communication in order to perform rapid shutdown, or the like.

Figure 4:
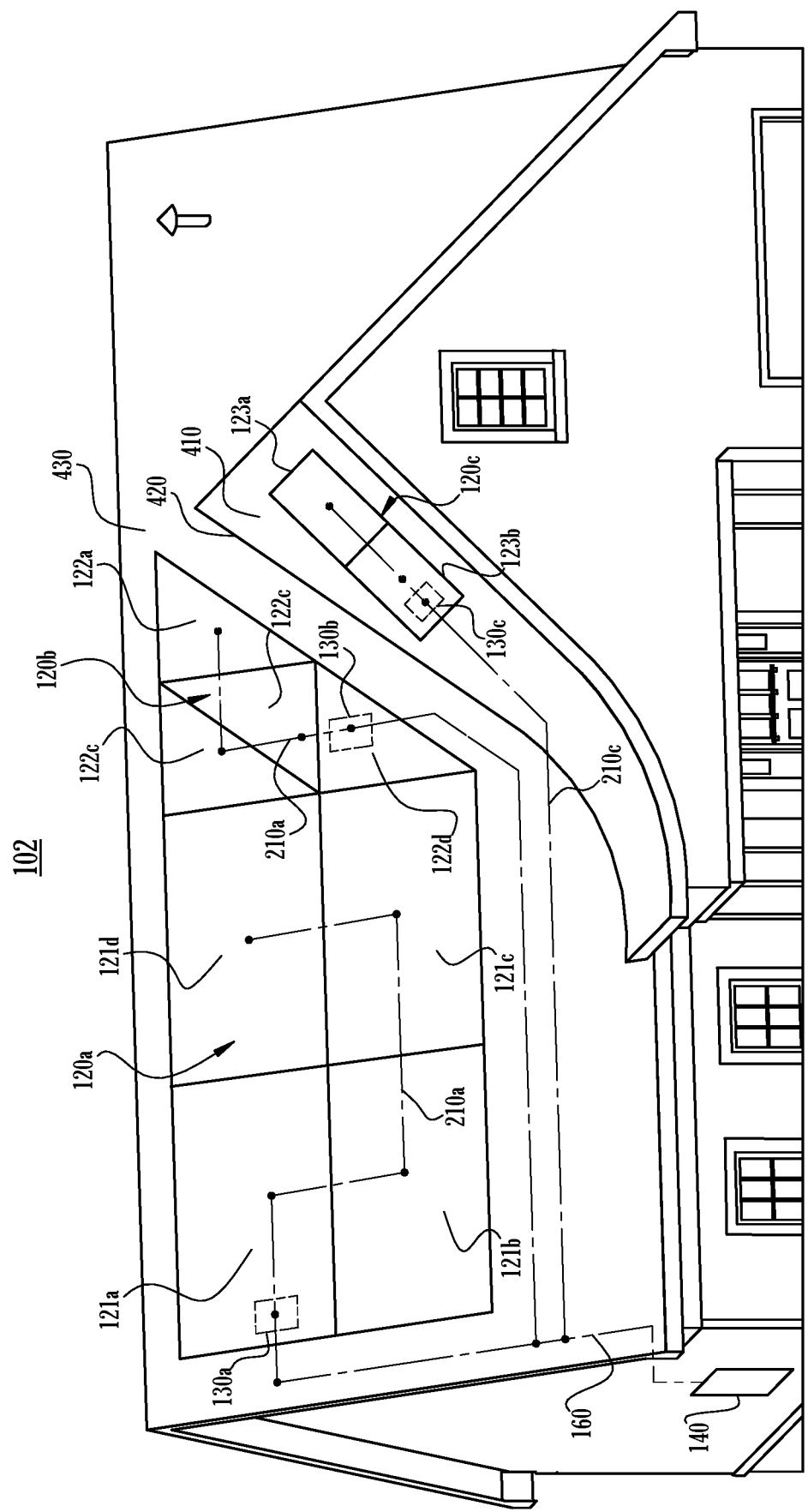
FIG. 4 is a perspective view illustrating one embodiment of a building structure roof demonstrating a geometric adaptability of an adaptive MPPT translator photovoltaic system.

FIG. 4 is a perspective illustration of a building structure roof demonstrating the geometric adaptability of the adaptive MPPT translator photovoltaic system 102. FIG. 4 represents an alternate configuration of adaptive MPPT translator photovoltaic system 100, from FIGS. 1 and 2. An adaptive MPPT translator photovoltaic system 102, in the depicted embodiment, comprises solar panels 121a-d, 122a-d, 123a-b in sets of panel strings 120a-c which are connected to respective adaptive MPPT translator modules 130a-c via string buses 210a-c. Adaptive MPPT translator modules 130a-c may be connected to a photovoltaic system hub 140 via a power bus 160, or the like. String 120b demonstrates usage of an alternate panel 120 set when compared to string 120a, which is handled by the adaptive MPPT module 130. String 120c demonstrates usage of the adaptive module 130 to handle an alternate section of roof 410 with light condition differing from roof section 430. Usage of an adaptive MPPT translator module 130 may permit varying string lengths 120a-c and alternate panels sizes 121a-d, 122a-d, 123a-b, which may permits the conforming of system 102 to geometric constraints of a roofline 410.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
    a power hub;
    one or more solar panel strings, the one or more solar panel strings comprising solar panels;
    an adaptive maximum power point tracking ("MPPT") translator module in electrical communication with the solar panels of the one or more solar panel strings of a solar panel array, the adaptive MPPT translator module individually optimizing power produced by each of the one or more solar panel strings without impacting power output of the solar panel array and comprising a voltage converting unit and configured to control the solar panels of the one or more solar panel strings according to a MPPT translator algorithm such that each of the one or more solar panel strings vary in number of the solar panels and in power output capacity of the solar panels and physical configurations of the one or more solar panel strings are adaptive to power needs, physical surfaces, and environmental geometric space constraints, the MPPT translator algorithm controlling the solar panels of the one or more solar panel strings of the solar panel array according to a set of rules and priorities for the rules;
    a power bus, the power bus providing electrical communication between the adaptive MPPT translator module and the power hub, the power hub in electrical communication with a power demand.

2. The system of claim 1, wherein the adaptive MPPT translator module further comprises a processor in electrical communication with the voltage converting unit, the processor configured to perform calculations of the MPPT translator algorithm.

3. The system of claim 1, wherein the adaptive MPPT translator module is configured to electrically simulate a behavior of the solar panels of the one or more solar panel strings.

4. The system of claim 1, wherein the voltage converting unit comprises a DC-DC switching voltage regulator.

5. The system of claim 1, wherein the adaptive MPPT translator module further comprises a wireless module.

6. The system of claim 5, wherein the wireless module is configured to perform a rapid shutdown operation.

7. The system of claim 1, wherein the adaptive MPPT translator module further comprises a power line communication module configured to perform a rapid shutdown operation.

8. The system of claim 1, wherein the power hub comprises a MPPT module.

9. The system of claim 1, wherein the power hub comprises a generic power hub produced by a third-party manufacturer.

10. An apparatus comprising:
    a voltage converting unit comprising an electrical input and an electrical output; and
    an adaptive maximum power point tracking ("MPPT") translator module configured to control solar panels of one or more solar panel strings of a solar panel array according to a MPPT translator algorithm such that each of the one or more solar panel strings vary in number of the solar panels and in power output capacity of the solar panels and physical configurations of the one or more solar panel strings are adaptive to power needs, physical surfaces, and environmental geometric space constraints, the adaptive MPPT translator module individually optimizing power produced by each of the one or more solar panel strings without impacting power output of the solar panel array and providing electrical power from the electrical input of the voltage converting unit to the electrical output such that the electrical power is usable by a downstream power demand, the MPPT translator algorithm controlling the solar panels of the one or more solar panel strings of the solar panel array according to a set of rules and priorities for the rules.

11. The apparatus of claim 10, further comprising a processor in electrical communication with the voltage converting unit, the processor configured to perform calculations of the MPPT translator algorithm.

12. The apparatus of claim 10, further comprising a wireless module.

13. The apparatus of claim 12, wherein the wireless module is configured to perform a rapid shutdown operation.

14. The apparatus of claim 10, further comprising a power line communication module configured to perform a rapid shutdown operation.

15. The apparatus of claim 10, wherein the adaptive MPPT translator module is configured to simulate an electrical behavior of the solar panels.

16. The apparatus of claim 10, wherein the voltage converting unit comprises a DC-DC switching voltage regulator.

17. A method comprising:
    providing a plurality of solar panels arranged in one or more solar panel strings of a solar panel array configured to provide input power;
    using one or more voltage converting units at ends of each of the one or more solar panel strings to perform a maximum power point tracking ("MPPT") translator algorithm for individually optimizing power produced by each of the one or more solar panel strings without impacting power output of the solar panel array, the MPPT translator algorithm controlling the solar panels of the one or more solar panel strings of the solar panel array according to a set of rules and priorities for the rules; and
    receiving output from each of the voltage converting unit onto a bus, the bus configured to supply the output to a power demand.

* * * * *